(12) United States Patent
Heinbokel et al.

(10) Patent No.: US 8,069,684 B2
(45) Date of Patent: Dec. 6, 2011

(54) CONTROL OF A REFRIGERATION CIRCUIT WITH AN INTERNAL HEAT EXCHANGER

(75) Inventors: Bernd Heinbokel, Cologne (DE); Urs Schmid, Schotz (CH)

(73) Assignee: Carrier Corporation, Farmington, CT (US)

( * ) Notice: Subject to any disclaimer, the term of this patent is extended or adjusted under 35 U.S.C. 154(b) by 823 days.

(21) Appl. No.: 11/816,646

(22) PCT Filed: Feb. 18, 2005

(86) PCT No.: PCT/EP2005/001719
§ 371 (c)(1),
(2), (4) Date: Jan. 30, 2008

(87) PCT Pub. No.: WO2006/087004
PCT Pub. Date: Aug. 24, 2006

(65) Prior Publication Data
US 2008/0223056 A1    Sep. 18, 2008

(51) Int. Cl.
*F25B 41/04* (2006.01)
(52) U.S. Cl. ............... 62/225; 62/210; 62/212; 62/222; 62/224; 62/513
(58) Field of Classification Search .............. 62/113, 62/210, 212, 222, 224, 225, 513
See application file for complete search history.

(56) References Cited

U.S. PATENT DOCUMENTS 6,457,313 B1 * 10/2002 Fujii ..................... 60/653
7,076,964 B2    7/2006 Sakakibara
7,143,595 B2    12/2006 Doi et al.

FOREIGN PATENT DOCUMENTS

| DE | 3430550 A1 | 4/1985 |
|---|---|---|
| DE | 3442169 A1 | 5/1986 |
| DE | 20313777 U1 | 1/2005 |
| EP | 1014013 A1 | 6/2000 |
| EP | 1026459 A1 | 8/2000 |
| GB | 1154588 A | 6/1969 |

(Continued)

OTHER PUBLICATIONS

J. Sarkar et al., Carbon Dioxide based Cascade Systems for Simultaneous Refrigeration and Heating Applications, Department of Mechanical Engineering, Indian Institute of Technology, Aug. 29, 2004, Kharagpur, India.

(Continued)

*Primary Examiner* — Cheryl J Tyler
*Assistant Examiner* — Paolo Gonzalez
(74) *Attorney, Agent, or Firm* — Bachman & LaPointe, P.C.

(57) ABSTRACT

Refrigeration circuit (2) for circulating a refrigerant in a predetermined flow direction, having in flow direction a heat rejecting heat exchanger (4), an evaporator throttle valve (8), an evaporator (10), a compressor (22), an internal heat exchanger (16) placed with its "cool side" between the evaporator (10) and the compressor (22), an inlet temperature sensor (24) located between the evaporator (10) and the internal heat exchanger (16) and an outlet temperature sensor (26) located between the internal heat exchanger (16) and the compressor (22), and a control (28) for controlling the evaporator throttle valve (8) based on the inlet and outlet temperature sensor measurement, wherein the control is adapted for controlling the evaporator throttle valve (8) based on an inlet temperature setpoint at the inlet temperature sensor (24); and shifting the inlet temperature setpoint based on the outlet temperature sensor measurement (26).

16 Claims, 1 Drawing Sheet

FOREIGN PATENT DOCUMENTS

WO    2004/053406 A1    6/2004

OTHER PUBLICATIONS

Patent Abstracts of Japan, vol. 2003, No. 08, Aug. 6, 2003, JP 2003 121012A (Mitsubishi Heavy Ind. Ltd.) Apr. 23, 2003.
Patent Abstracts of Japan, vol. 2003, No. 12, Dec. 5, 2003, JP 2004 028485A (Sanyo Electric Co. Ltd.) Jan. 29, 2004.
Patent Abstracts of Japan, vol. 2003, No. 12, Dec. 5, 2003, JP 2004 011959A (Sanyo Electric Co. Ltd.) Jan. 15, 2004.
Patent Abstracts of Japan, vol. 1999, No. 10, Aug. 31, 1999, JP 11 142007A (Nippon Soken Inc.; Denso Corp.) May 28, 1999.
Patent Abstracts of Japan, vol. 1998, No. 10, Aug. 31, 1998, JP 10 141822A (Hoshizaki Electric Co. Ltd.) May 29, 1998.

* cited by examiner

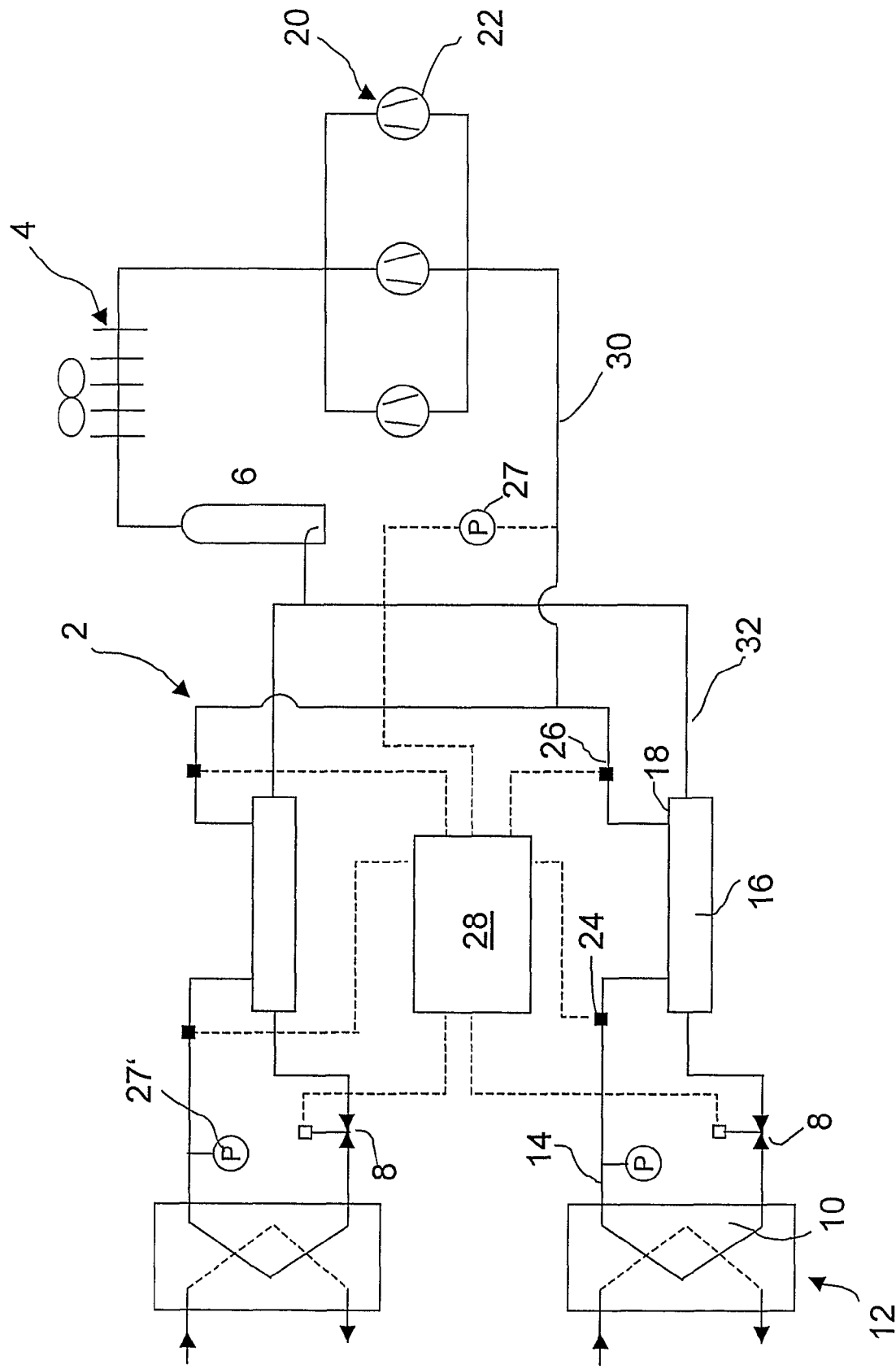

CONTROL OF A REFRIGERATION CIRCUIT WITH AN INTERNAL HEAT EXCHANGER

BACKGROUND OF THE INVENTION

The present invention relates to a refrigeration circuit for circulating a refrigerant in a predetermined flow direction, comprising in flow direction a heat rejecting heat exchanger, an evaporator throttle valve, an evaporator, a compressor, an internal heat exchanger placed with its "cold side" between the evaporator and the compressor, a temperature sensor, and a control for controlling the evaporator throttle valve based on temperature sensor signals as provided by the temperature sensor.

Refrigeration circuits of this type the temperature sensor is located between the evaporator and the internal heat exchanger and they are operated in an operational mode which is called "semi flood". "Semi flood" refers to the condition of the evaporator which instead of completely evaporating the refrigerant in the evaporator provides a mixture of gaseous and liquid refrigerant at its outlet which has a very low superheat. The internal heat exchanger will rise the superheat of this gaseous/liquid refrigerant, thus evaporating the remainder of the liquid refrigerant and securing safe operation of the compressor to which the refrigerant is directed subsequent to the internal heat exchanger. As is well-known, liquid refrigerant at the inlet of the compressor can cause severe damage of the compressor.

For optimum heat exchange in the evaporator the temperature sensor is provided at the outlet of the evaporator. Together with a measured pressure value, for example the suction pressure, the evaporating temperature and the superheat is calculated. Based on the temperature or superheat at the outlet of the evaporator the control controls the evaporator throttle valve and thus the flow of the refrigerant to the evaporator. Depending on the particular cooling requirement by the refrigeration consumer an optimum setpoint for the refrigerant flow through the evaporator can be maintained.

The system is, however, not dependent on the cooling requirement only, but also on other parameters like ambient temperature, etc. For example the condensation temperature rises up to 47° C. in summer time mode while it could be reduced down to 15° C. in winter time in order to optimise the energy consumption of the refrigerant circuit. This will result in a much lower capacity of the internal heat exchanger due to smaller temperature differences in the winter mode. In consequence liquid in the gaseous refrigerant may flow to the compressor because the capacity of the internal heat exchanger is too small. In summer mode, on the other side, the discharge temperature of the compressor could become critical, resulting in decomposition of the refrigerant and/or the lubricant as conventionally present in the refrigerant in some amount.

SUMMARY OF THE INVENTION

Accordingly, it is an object of the present invention to provide for a refrigeration circuit and a method for operating such a circuit, which allows for an adaptation of such circuit to different winter and summer mode operation conditions.

In accordance with an embodiment of the present invention this object is solved by providing an outlet temperature sensor between the internal heat exchanger and the compressor and a control for controlling the evaporator throttle valve based on the outlet temperature sensor measurement.

Thus, in accordance with an embodiment of the present invention the temperature or superheat at the output of the internal heat exchanger is used for setting the degree of opening the evaporator throttle valve and the intended condition of the refrigerant flowing to the compressor inlet is secured.

In accordance with an embodiment of the present invention the refrigeration circuit further comprises an inlet temperature sensor which is located between the evaporator and the internal heat exchanger wherein the control is adapted for controlling the evaporator throttle valve based on the inlet and outlet temperature sensor measurements. In consequence of the broad range of ambient temperature conditions the control based on the inlet temperature sensor may not be the optimum control for the refrigeration circuit within the complete broad range. Particularly, it can be preferred to switch over between the inlet temperature sensor and the outlet temperature sensor depending on particular conditions, for example the ambient temperature. Such switching over can be performed either manually or automatically. For example the switching over can be performed once the condensation temperature is lowered below a predetermined value. It is also possible to use the measurements of both values for determining or calculating the correct degree of opening the evaporator throttle valve.

In accordance with an embodiment of the present invention the liquid refrigerant flowing toward the evaporator throttle valve may provide the heat for superheating the liquid/gaseous refrigerant as discharged from the evaporator. To this effect the "cold side" of the internal heat exchanger may be placed in the circuit between the evaporator and the compressor. Thus the refrigerant flowing towards the evaporator, which is normally associated with the refrigeration consumer, is subcooled while the refrigerant flowing towards the compressor is superheated with both effects being advantageous for such refrigeration circuit. The "hot side" of the internal heat exchanger can also be connected to any other suitable heat source within or outside of the refrigeration circuit. Providing the "hot side" between the heat rejecting heat exchanger (and the receiver, respectively) and the evaporator throttle valve has the advantage of subcooling the refrigerant in advance of the evaporator throttle resulting in a reduced generation of flash gas at this position of the circuit. Together with the superheating of the suction gas, i.e. the refrigerant flowing toward the compressor, this provides for an optimum heat shift within the refrigeration circuit.

In accordance with an embodiment of the present invention, the refrigerant can be, for example $CO_2$, and the refrigeration circuit is adapted for operation in the supercritical operational mode and the heat rejecting heat exchanger is adapted to operate as a condenser and as a gascooler. A "supercritical" refrigerant designates a refrigerant which requires operating the refrigeration circuit in supercritical condition at least in some operational modes. For example with the $CO_2$ refrigerant the summer mode normally is supercritical, while the winter mode may be a normal operational mode with the highest pressure in the refrigeration circuit being below the critical pressure. In such a refrigeration circuit with a supercritical refrigerant the heat rejecting heat exchanger is typically termed "gascooler", which means that such gascooler is likewise adapted for cooling the gaseous refrigerant in supercritical mode and for condensing the gaseous refrigerant in normal mode.

An embodiment of the present invention relates to a refrigeration apparatus comprising a refrigeration circuit in accordance with any of the aforementioned embodiment of the inventive refrigeration circuit and particularly when the evaporator works as a $CO_2$-cascade condenser. $CO_2$ is then used as low and high temperature refrigerant. The refrigeration apparatus can be a refrigeration system for a supermarket, etc., for providing refrigeration to display cabinets, etc.

With a $CO_2$-cascade condenser the "hot side" of the internal heat exchanger may be connected with the discharge gas from the low temperature compressor(s).

In accordance with an embodiment of the present invention also a method for operating a refrigeration circuit for circulating a refrigerant in a predetermined flow direction is provided, wherein in flow direction the refrigeration circuit comprises a heat rejecting heat exchanger, an evaporator throttle valve, an evaporator, a compressor, an internal heat exchanger placed with its "cold side" between the evaporator and the compressor, an outlet temperature sensor located between the internal heat exchanger and the compressor, and a control, wherein the method comprises the step of controlling the evaporator throttle valve based on the outlet temperature sensor and (suction) pressure measurement. In general such method as well as the preferred embodiment methods as described below can be used together with the embodiments of the refrigeration circuit as disclosed in this application.

In accordance with an embodiment of the present invention the method further relates to a refrigeration circuit further comprising an inlet temperature sensor, which is located between the evaporator and the internal heat exchanger and comprises the step of controlling the evaporator throttle valve based on the inlet and outlet temperature sensor and pressure measurements.

In accordance with an embodiment of the present invention the step of
controlling the evaporator throttle valve includes the steps of controlling the evaporator throttle valve based on an inlet temperature setpoint at the inlet temperature sensor; and shifting the inlet temperature setpoint based on the outlet temperature sensor measurement.

The inlet temperature setpoint can also be defined as a differential temperature setpoint, i.e. a superheat setpoint. The actual superheat can be calculated by subtracting the evaporation temperature which can be calculated from the measured suction pressure, from the inlet temperature. Similarly an outlet temperature superheat set point can be defined.

The "inlet temperature" or any other "temperature", "temperature sensor value", "temperature measurement", etc. does not necessarily have to be a "temperature" in the exact sense of this word, but can be a value indicating a particular temperature value. Likewise it suffices that the temperature sensors provide data indicating a particular temperature, even though they can also be sensors of the type providing the exact temperature value. In accordance with such method, the inlet temperature sensor, i.e. the temperature at the output of the evaporator will control the degree of opening the evaporator valve as it is conventional. However, an adaptation of the setpoint for such control is made based on the temperature at the outlet of the internal heat exchanger. Thus the outlet temperature sensor will merely affect the setpoint for the regulation or control and the control is performed with the input temperature measurement for optimising the efficiency of the evaporator and the whole system.

In accordance with a preferred embodiment of the present invention the characteristic time constant for shifting the inlet temperature or superheat set point is substantially higher than the characteristic time constant for the control of the evaporator throttle valve based on the inlet temperature. This ensures that mainly the inlet temperature or inlet temperature measurement together with the evaporating temperature drives the evaporator throttle valve. Instead of using a higher characteristic time constant for shifting of the inlet temperature or superheat setpoint a relatively broad allowable range for the outlet temperature sensor measurements can be determined so that a shifting of the inlet temperature or superheat setpoint is only performed when the outlet temperature measurements go beyond the allowed range.

In accordance with an embodiment of the present invention the step of shifting comprises the step of comparing the outlet temperature sensor measurement with an outlet temperature setpoint or an outlet temperature range and lowering the inlet temperature or superheat setpoint if the outlet temperature sensor measurement is above the outlet temperature setpoint or the upper range of the outlet temperature set point, and raising the inlet temperature set point if the outlet temperature sensor measurement is below the outlet temperature set point or the lower end of the outlet temperature range, respectively.

In accordance with an embodiment of the present invention the step of
controlling the evaporator throttle valve may also include the steps of
calculating a first degree of opening for the evaporator throttle valve based on the inlet temperature sensor measurement and suction pressure;
calculating a second degree of opening for the evaporator throttle valve based on the outlet temperature sensor measurement and possibly the suction pressure;
determining the lower value of the first an second degrees of opening; and controlling the evaporator throttle valve based on such lower degree of opening.

With such type of control, either the inlet temperature sensor measurement or the outlet temperature sensor measurement possibly together with the suction pressure measurements controls the evaporator valves. An individual temperature or superheat setpoint or temperature or superheat range for the inlet temperature sensor and/or the outlet temperature sensor can be used. Such temperature setpoint or range can either be fixed or can alternatively be controlled by the control.

In accordance with a preferred embodiment of the present invention the characteristic time constant for the control based on the outlet temperature sensor measurement is substantially higher than the characteristic time constant for the control based on the inlet temperature sensor measurement. Also a broader temperature range can be used with the outlet temperature sensor similarly as disclosed above.

In accordance with a preferred embodiment of the present invention the setpoint or respective upper end of the range of the intlet temperature is about 3 K above the temperature of the saturated gaseous refrigerant at this location in the circuit.

BRIEF DESCRIPTION OF THE DRAWINGS

Embodiments of the present invention are described in greater detail below with reference to the FIGURES wherein the only FIGURE shows a refrigeration circuit in accordance with an embodiment of the present invention.

DETAILED DESCRIPTION

In the FIGURE a refrigeration circuit 2 is shown for circulating a refrigerant which consists of one or a plurality of components, also $CO_2$, in a predetermined flow direction.

The refrigeration circuit 2 can be used for example for supermarket or industrial refrigeration. In flow direction the refrigeration circuit 2 comprises a heat rejecting heat exchanger 4 which in case of a supercritical fluid like $CO_2$ operates as a gascooler 4. Subsequent to the gascooler 4 the $CO_2$ passes a high pressure regulating valve and flows to a receiver 6. The receiver 6 collects and stores the refrigerant for subsequent delivery to one or a plurality of evaporator throttle valves 8 of one or a plurality of refrigeration consumer(s) 12. Additional the receiver 6 separates the flash gas which is passed via a pressure regulation valve to the suction line 30. Connected to the evaporator throttle valve 8 is an evaporator 10. The evaporator outlet 14 is connected to an internal heat exchanger 16, the outlet 18 thereof being connected to a compressor unit 20 comprising a plurality of compressors 22.

The evaporator throttle valve 8 can be an electronic expansion valve (EEV). The evaporator throttle valve can be controlled based on measurement values, for example temperature values and pressure valves. A control 28 can be provided for controlling the evaporator throttle valve 8. The control 28 is preferably the Linde control UA300E. Temperature gauges or sensors 24 and 26, particularly an inlet temperature sensor 24 as well as an outlet temperature sensor 26 can be present anywhere between the outlet 14 of the evaporator 10 and the inlet of the internal heat exchanger, and the outlet 18 of the internal heat exchanger and the inlet to the compressor unit 22 or the compressor, respectively. In case of a plurality of refrigeration consumer circuits one outlet temperature sensor 26 can be provided for each refrigeration consumer circuit. It is also possible to use a single outlet temperature sensor in the joint suction line 30 belonging to all such refrigeration consumer circuits. Similarly pressure gauges or sensors 27 and/or 27' can be present in the circuit to measure the suction pressure. The measured suction pressure is used for calculating the evaporation temperature in the evaporators 10. The suction pressure can generally be measured at position 27 and as well on position 27' with only minor differences therebetween which can be taken into account when calculating the evaporation pressure.

Instead of the joint control 28 a plurality of controls for each refrigeration consumer circuit or for each temperature sensor 24, 26, etc., can be used.

In operation the internal heat exchanger 16 superheats the refrigerant exiting from the outlet 14 of the evaporator in order to ensure delivery of a dry gaseous refrigerant, i.e. "suction gas", to the compressor 22. The suction gas is on the "cold side" of the internal heat exchanger 16, while the high pressure refrigerant flowing through line 32 is on the "hot side" of the internal heat exchanger 16 so that heat from the "hot side" is transferred to the "cold side" suction gas. In consequence the high pressure refrigerant is "subcooled". subcooling reduces the amount of flash gas after the evaporator throttle valve 8. Concurrently the suction gas is superheated, thus ensuring the delivery of dry suction gas to compressor 22.

A PI- or a PID-control (PI—proportional-integral, and PID—proportional-integral-differential) can be used for controlling the evaporator throttle valve 8 on the basis of the temperature sensor measurements. Such control may be incorporated in the control 28. The PI- or PID-control of the outlet temperature sensor 26 behind the internal heat exchanger 16 controls the superheating or suction gas temperature. The control 28 or respective individual controls may calculate in parallel a degree of opening for the evaporator throttle valve 8, with the lower degree determining the degree of opening of the evaporator throttle valve or electronic expansion valve 8. At standard running condition the expansion is controlled by the input temperature sensor 24. If the temperature at the outlet 18 and the outlet temperature sensor 26, respectively, is lower than its setpoint, the control 28 begins to control the evaporator throttle valve 8 based on to the degree of opening as determined from such outlet temperature. The PI parameter at the outlet temperature sensor 26 can be much slower than those of the PI- or PID-control of the inlet temperature sensor 24. For this reason the risk for oscillations in the system can be reduced.

Alternatively, when two temperature sensors 24, 26 are used, particularly an inlet temperature sensor 24 and an outlet temperature sensor 26, it is possible to shift the superheat setpoint of the control based on the inlet temperature 24 dependent on the temperature at the outlet temperature sensor 26. It is preferred to design the system in a way that the shifting of the setpoint for the inlet temperature 24 is much slower than the PI- or PID-control based on the measurement of the inlet temperature. Accordingly, there is no increase in the risk for oscillations, which might be the case if the control is based only on the output temperature sensor 26.

The invention claimed is:

1. Refrigeration circuit (2) for circulating a refrigerant in a predetermined flow direction, comprising in the flow direction:
   a heat rejecting heat exchanger (4);
   an evaporator throttle valve (8);
   an evaporator (10); and
   a compressor (22), and the circuit further comprising:
      an internal heat exchanger (16) placed with its "cool side" between the evaporator (10) and the compressor (22);
      an inlet temperature sensor (24) located between the evaporator (10) and the internal heat exchanger (16);
      an outlet temperature sensor (26) located between the internal heat exchanger (16) and the compressor (22); and
      a control (28) for controlling the evaporator throttle valve (8) based on the inlet and outlet temperature sensor measurement, wherein the control is adapted for:
         controlling the evaporator throttle valve (8) based on an inlet temperature setpoint at the inlet temperature sensor (24); and
         shifting the inlet temperature setpoint based on the outlet temperature sensor measurement (26); and
         determining an allowable range for the outlet temperature sensor measurements so that the shifting of the inlet temperature setpoint is only performed when the outlet temperature measurements go beyond the allowable range.

2. Refrigeration circuit (1) according to claim 1, wherein the internal heat exchanger (16) is placed with its "hot side" between the heat rejecting heat exchanger (4) and the evaporator throttle valve (8).

3. Refrigeration circuit (2) according to claim 1, wherein the refrigeration circuit is adapted to operate in a supercritical operational mode and the heat rejecting heat exchanger (4) is adapted to operate as a gascooler and a condenser, respectively.

4. Refrigeration apparatus comprising a refrigeration circuit (2) in accordance with claim 1.

5. $CO_2$-cascade refrigeration apparatus comprising a refrigeration circuit (2) in accordance with claim 3.

6. Refrigeration circuit (2) for circulating a refrigerant in a predetermined flow direction, comprising in the flow direction:
   a heat rejecting heat exchanger (4);
   an evaporator throttle valve (8);
   an evaporator (10); and
   a compressor (22), and the circuit further comprising:
      an internal heat exchanger (16) placed with its "cool side" between the evaporator (10) and the compressor (22);

an inlet temperature sensor (24) located between the evaporator (10) and the internal heat exchanger (16);

an outlet temperature sensor (26) located between the internal heat exchanger (16) and the compressor (22); and a control (28) for controlling the evaporator throttle valve (8) based on the inlet and outlet temperature sensor measurement, wherein the control is adapted for:

calculating a first degree of opening for the evaporator throttle valve (8) based on the inlet temperature;

calculating a second degree of opening for the evaporator throttle valve (8) based on the outlet temperature;

determining the lower value of the first and second degrees of opening; and controlling the evaporator throttle valve (8) based on such lower degree of opening.

7. Refrigeration circuit (2) according to claim 6, wherein the internal heat exchanger (16) is placed with its "hot side" between the heat rejecting heat exchanger (4) and the evaporator throttle valve (8).

8. Refrigeration circuit (2) according to claim 6, wherein the refrigeration circuit is adapted to operate in a supercritical operational mode and the heat rejecting heat exchanger (4) is adapted to operate as a gascooler and a condenser, respectively.

9. Refrigeration apparatus comprising a refrigeration circuit (2) in accordance with claim 6.

10. $CO_2$-cascade refrigeration apparatus comprising a refrigeration circuit (2) in accordance with claim 9.

11. Method for operating a refrigeration circuit (2) for circulating a refrigerant in a predetermined flow direction, the circuit comprising in the flow direction:

a heat rejecting heat exchanger (4);

an evaporator throttle valve (8);

an evaporator (10); and a compressor (22), and the circuit further comprising:

an internal heat exchanger (16) placed with its "cool side" between the evaporator (10) and the compressor (22);

an inlet temperature sensor (24) located between the evaporator (10) and the internal heat exchanger (16);

an outlet temperature sensor (26) located between the internal heat exchanger (16) and the compressor (22); and a control (28), wherein the method comprises:

controlling the evaporator throttle valve (8) based on the inlet and outlet temperature sensor measurements, by controlling the evaporator throttle valve (8) based on an inlet temperature setpoint at the inlet temperature sensor (24);

shifting the inlet temperature setpoint based on the outlet temperature sensor measurement (26); and determining an allowable range for the outlet temperature sensor measurements so that the shifting of the inlet temperature setpoint is only performed when the outlet temperature measurements go beyond the allowable range.

12. Method according to claim 11, wherein a characteristic time constant for shifting the inlet temperature setpoint is substantially higher than a characteristic time constant for the control of the evaporator throttle valve (8) based on the inlet temperature sensor measurement.

13. Method according to claim 11, wherein the step of shifting comprises the step of comparing the outlet temperature with an outlet temperature setpoint and lowering the inlet temperature setpoint if the outlet temperature is above the outlet temperature setpoint and raising the inlet temperature setpoint if the outlet temperature is below the outlet temperature setpoint, respectively.

14. Method according to claim 13, wherein the setpoint of the outlet temperature is about 3K above the temperature of the saturated gaseous refrigerant at this location in the circuit (2).

15. Method for operating a refrigeration circuit (2) for circulating a refrigerant in a predetermined flow direction, the circuit comprising in the flow direction:

a heat rejecting heat exchanger (4);

an evaporator throttle valve (8);

an evaporator (10); and a compressor (22), and the circuit further comprising:

an internal heat exchanger (16) placed with its "cool side" between the evaporator (10) and the compressor (22);

an inlet temperature sensor (24) located between the evaporator (10) and the internal heat exchanger (16);

an outlet temperature sensor (26) located between the internal heat exchanger (16) and the compressor (22); and a control (28), wherein the method comprises:

controlling the evaporator throttle valve (8) based on the inlet and outlet temperature sensor measurements, by calculating a first degree of opening for the evaporator throttle valve (8) based on the inlet temperature;

calculating a second degree of opening for the evaporator throttle valve (8) based on the outlet temperature;

determining the lower value of the first and second degrees of opening; and controlling the evaporator throttle valve (8) based on such lower degree of opening.

16. Method according to claim 15, wherein a characteristic time constant for the control based on the outlet temperature sensor (26) is substantially higher than a characteristic time constant for the control based on the inlet temperature sensor (24).

* * * * *